United States Patent [19]

Bannink, Jr.

[11] Patent Number: 4,789,918

[45] Date of Patent: Dec. 6, 1988

[54] FASTENED LIGHTNING PROTECTION REPAIR SYSTEM AND METHOD FOR ITS USE

[75] Inventor: Engbert T. Bannink, Jr., Auburn, Wash.

[73] Assignee: The Boeing Company, Seattle, Wash.

[21] Appl. No.: 927,042

[22] Filed: Nov. 3, 1986

[51] Int. Cl.$^4$ ............................................. H05F 1/02
[52] U.S. Cl. ................................. 361/218; 244/1 A; 361/117
[58] Field of Search .............. 361/117, 218, 217, 214; 244/1 A, 121, 125, 126, 136

[56] References Cited

U.S. PATENT DOCUMENTS

| | | | |
|---|---|---|---|
| 3,989,984 | 11/1976 | Amason et al. | 361/218 X |
| 4,502,092 | 2/1985 | Bannick, Jr. et al. | 361/218 |
| 4,574,325 | 3/1986 | Holton | 361/218 |
| 4,628,402 | 12/1986 | Covey | 361/218 |

Primary Examiner—A. D. Pellinen
Assistant Examiner—Todd E. DeBoer
Attorney, Agent, or Firm—Seed and Berry

[57] ABSTRACT

A lightning protection repair system for graphite epoxy structures. An aircraft graphite epoxy structure is repaired by fastening a repair plate over the hole to be covered, followed by a dielectric sheet covering the outer surface of the metal repair plate. An electrically conducting lightning diversion sheet, conforming to the outer surface of the repair plate, is fastened to the repair plate through the dielectric sheet. The edges of the lightning diversion sheet are bent toward the outer surface of the aircraft graphite epoxy structure to be adjacent or touching its outer surface. Sealing compounds can be used around the repair plate to prevent moisture intrusion, and the repair can be faired into the aircraft graphite epoxy structure by means of a fairing compound.

9 Claims, 1 Drawing Sheet

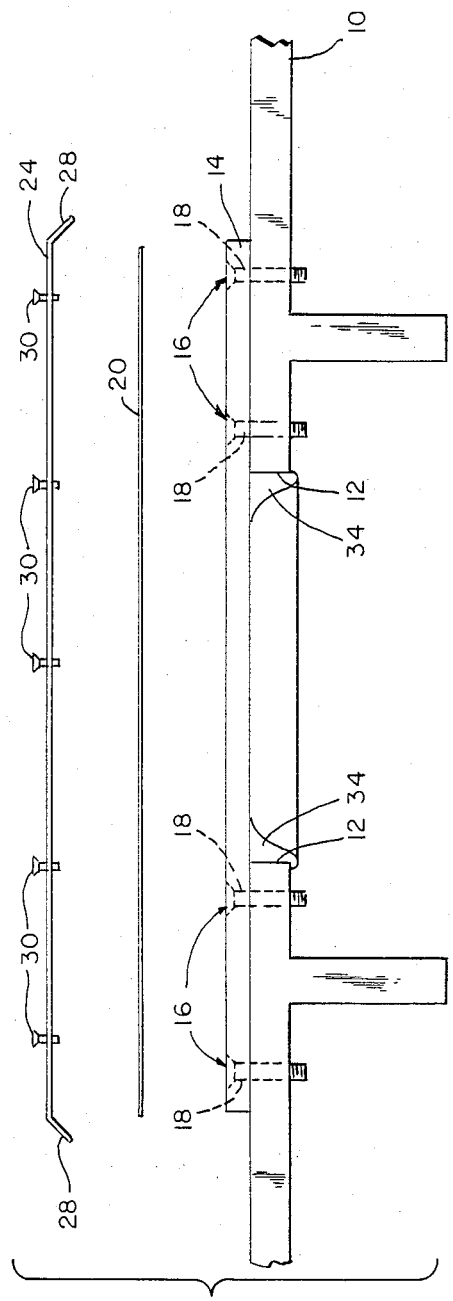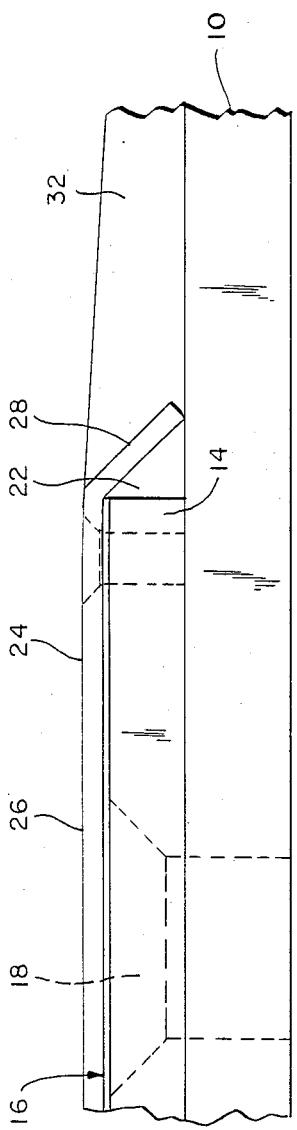
FIG. 1
FIG. 2

FASTENED LIGHTNING PROTECTION REPAIR SYSTEM AND METHOD FOR ITS USE

TECHNICAL FIELD

The present invention relates to repairing lightning protection systems for aircraft, and more particularly, to fastened repair systems and methods for providing lightning protection of aircraft structures made from composite structural components.

BACKGROUND ART

It is known that the graphite epoxy structural components used on aircraft are subjected to natural lightning strike discharges. The most severe strikes are directed toward small-radius structures located at or near extending surfaces of the aircraft (wing tips, stabilizer tips, vertical tips, rudder, elevators, ailerons, engine cowlings, etc.). These locations are designated as "Zone 1" and are subjected to the initial attachment of the lightning channel. The initial attachment lightning stroke is characterized by a fast-rise, high-peak current ($2 \times 10^5$ amps) and a large energy transfer ($2 \times 10^6$ amps$^2$ sec). It can cause severe structural damage to unprotected graphite epoxy structures (much more damage than to comparable aluminum structures).

Other parts of the structure will be subjected to lesser discharges, called "swept stroke lightning." These areas are designated as "Zone 2" and are located aft of the original attachment points. Swept stroke lightning also contains a fast-rise current, but with a $1 \times 10^5$ amp peak and an energy transfer of $0.25 \times 10^6$ amps$^2$ sec.

Integral fuel tanks and pressurized sections are particularly sensitive areas on aircraft. Punctures cannot be tolerated in either area, but fasteners penetrating the skin and protruding into a fuel tank area have been shown to constitute a fuel ignition source even without a skin puncture. Unprotected fasteners are a preferred attachment point for the lightning and spark because the energy cannot be distributed fast enough into the surrounding graphite epoxy material (due to its low thermal and electrical conductivity).

Representative of the use of lightning protection sytems in the prior art literature are U.S. Pat. Nos. 3,755,713; 4,479,163; and 4,502,092, assigned to The Boeing Company. Knitted wire mesh is utilized in the lightning protection system of U.S. Pat. No. 3,755,713, in contrast to the preferred embodiments of U.S. Pat. Nos. 4,479,163 and 4,502,092, which utilize nickel-plated graphite fibers. U.S. Pat. No. 3,755,713 shows only a decorative layer of knitted wire mesh, this layer providing insufficient coverage for any fastener heads. Further, this patent discloses no insulation between the fasteners and the structure since the reference structure is Fiberglas and, therefore, nonconductive.

U.S. Pat. No. 4,479,163 discloses an integral lightning protection system for composite aircraft skins. In this system, the composite graphite epoxy skin is covered by a nickel-plated graphite epoxy fabric comprising individual nickel-plated graphite fibers which are woven into the outer layer of fabric on the structural components requiring protection. Depending upon the protection desired (for Zone 1 or Zone 2, a varying percentage of the fiber tows in both the warp and fill direction of the fabric can be plated (for example, every second tow or every third tow).

The composite skin of the aircraft is secured to internal structural members by fasteners that extend inwardly through holes through the skin. The head of the fastener is preferably flush with the outer surface of the graphite epoxy fabric ply. Thereafter, a coating of primer and paint can be applied to the fiber ply.

In one embodiment of U.S. Pat. No. 4,479,163, a fastener passes through a hole in the skin that is lined with a cylindrical Fiberglas insulator. The graphite epoxy fiber fabric is then overlaid by a dielectric plastic strip, and the plastic strip is covered with a coating of primer and paint.

In U.S. Pat. No. 4,502,092, counterbore fasteners extend inwardly through the skin, where they are attached to structural elements. In various embodiments, the structural elements can be electrically insulated from the fastener, the structural elements themselves can be made from nonconductive material, and/or the internal panels, which are fastened in the interior of the compartment defined by the skin, can be electrically insulated from the structural support members attached to the skin. In each of the various embodiments of this patent, however, the fasteners are countersunk into the skin by forming a hole through the already-existing layer of graphite epoxy fiber fabric, inserting the fastener, and filling the remaining hole with potting compound. A dielectric layer can be attached over the graphite epoxy fiber fabric and potting compound layer, followed by a coating of primer and paint.

For a variety of reasons, such as accidental damage to the skin, it may be necessary to repair a graphite epoxy fiber fabric ply. It has been found in practice that following such a repair, the area of the repair is particularly susceptible to lightning strikes, even if the graphite epoxy structure is covered by at least one layer of metal-plated graphite fiber fabric. The reason is that state-of-the-art adhesives are nonconductive and, therefore, inhibit the dispersion of lightning currents out of the repair area. In this area of concentrated current, when the dielectric adhesive used to make the repair breaks down, internal and external arcing results, presenting a fuel ignition hazard and producing structural damage.

DISCLOSURE OF THE INVENTION

It is, therefore, an object of the present invention to provide a method and structure for repairing an aircraft graphite epoxy structure while providing lightning protection in the area of the repair.

It is still another object of the present invention to provide a repair system for protecting fasteners inserted into aircraft composite structures in order to prevent the occurrence of destructive lightning currents.

According to the present invention, a hole in the outer surface of a graphite epoxy aircraft skin is repaired by covering the hole with a repair plate. A dielectric layer is then placed over the outer surface of the repair plate, and an electrically conducting lightning diversion plate is placed over the dielectric sheet. The edges of the diversion plate are bent toward the outer surface of the skin to provide an electrical path between the diversion plate and the aircraft skin.

In another aspect of the present invention, a hole in the outer surface of an aircraft graphite epoxy structure is repaired by securing a repair plate over the hole with fasteners. Next, a dielectric sheet is placed over the repair plate, followed by an electrically conducting lightning diversion plate over the dielectric sheet. The diversion plate is bent to be adjacent the outer surface of the aircraft graphite epoxy structure.

BRIEF DESCRIPTION OF THE DRAWINGS

A full understanding of the present invention, and of its further objects and advantages and several unique aspects thereof, will be had from the following description when taken in conjunction with the accompanying drawings in which:

FIG. 1 is a cross-sectional view of a fastened lightning protection repair system showing the repair plate, the dielectric layer, and the diversion sheet; and FIG. 2 is a closeup cross-sectional view of the fastened lightning protection repair system showing the relationship of the diversion sheet and the aircraft graphite epoxy structure.

BEST MODE FOR CARRYING OUT THE INVENTION

Referring to FIG. 1, an aircraft graphite epoxy structure 10 having a hole 12 has been repaired by the fastened lightning protection system of the present invention. Hole 12 has been covered over by a repair plate 14, which can, for example, be made from aluminum. Repair plate 14 completely covers hole 12 from the outside of aircraft graphite epoxy structure 10. Plate 14 can be attached to graphite epoxy structure 10 by means of fasteners 16, which can, for example, be titanium bolts 18. The fasteners are countersunk into the outer surface of metal repair plate 14. A suitable form of fastener 16 is the Hi-Lok TM fastener.

Next, dielectric sheet 20, whose shape is the same as that of the outer surface of repair plate 14 is placed over the repair plate. The dielectric sheet can, for example, be a 5-mil film of Kapton TM, manufactured by DuPont Company of Wilmington, Del. The dielectric sheet prevents a lightning strike from creating sparks from the fasteners 16 that are holding repair plate 14.

As shown in the closeup view of FIG. 2, the edge of plate 14 can be sealed by means of a polysulfide sealant 22 to prevent moisture intrusion and subsequent freeze-thaw cycle damage. An electrically conducting lightning diversion plate 24 conforms surface of repair plate 14. The edges 28 of the diversion plate 24 are bent downwardly around the whole periphery of lightning diversion plate 24. Lightning diversion plate 24, which may be made from 32 mil aluminum sheet, is then attached to repair plate 14 by means of fasteners, such as countersunk screws 30. Edge 28 is bent downwardly so as to be adjacent the outer surface of aircraft graphite epoxy structure 10 (see FIG. 2). This creates an electrical path between the diversion plate 24 and the aircraft graphite spoxy structure. Finally, diversion plate 24 is faired into the surface of the aircraft graphite epoxy structure 10 by means of a ramp of fairing compound 32.

To ensure good lightning protection, before the lighning protection repair system of the present invention is installed, the top ply of aircraft graphite epoxy structure 10 can be sanded so that lightning diversion plate 24 will make electrical contact with the nickel-plated graphite epoxy fabric ply contained in the aircraft graphite epoxy structure 10. All aluminum parts used in this repair system can be alodined and primed prior to installation. In addition, fasteners 16 can be "wet installed" by covering the shanks of fasteners 16 with carbosphere-filled sealant. The fasteners, which can be attached on the inside of aircraft graphite epoxy structure 10, can be held in place by means of Hi-Lok TM collars which have been cap-sealed with polysulfide sealant. To provide a final level of weather protection to the repair, the line where hole 16 and metal repair plate 14 meet can also be sealed with a bead 34 of polysulfide sealant, a commonly used high-temperature sealant that is flexible after curing.

While various modifications can be made to the invention described above by one skilled in the art without departing from its scope and spirit, the invention is to be limited only by the following claims.

I claim:

1. The method of repairing a hole in the lightning protection system of an aircraft graphite epoxy structure including an outer layer of metal-plated graphite fiber fabric, comprising the steps of:
   placing a repair plate over the hole, the plate covering the entire hole and having an uncovered outer surface;
   attaching the repair plate to the aircraft graphite epoxy structure by means of fasteners;
   placing a dielectric sheet over the repair plate;
   placing an electrically conducting lightning diversion plate over the dielectric sheet, the diversion plate having an edge bent to be adjacent the outer layer of metal-plated graphite fiber fabric; and
   attaching the lightning diversion plate to the repair plate by fasteners.

2. The method of claim 1, further comprising the step of fairing the lightning diversion plate to the aircraft graphite epoxy structure with a compound.

3. A lightning protection repair system in an aircraft graphite epoxy structure, said structure including an outer layer of metal-plated graphite fiber fabric and having a hole defined by an edge therein, said repair system comprising:
   a repair plate placed over the hole in the aircraft graphite epoxy structure, said repair plate completely covering the hole and being attached to the aircraft graphite epoxy structure by fasteners;
   a dielectric sheet covering the entire outer surface of the repair plate; and
   an electrically conducting lightning diversion plate placed over the dielectric sheet and being attached to the repair plate by fasteners, the edge of the diversion plate extending beyond the edge of the repair plate and being bent to be adjacent the outer layer of metal-plated graphite fiber fabric.

4. The lightning protection repair system of claim 3, wherein the electrically conducting lightning diversion plate is made from aluminum.

5. The lightning protection repair system of claim 4, wherein the repair plate is made from aluminum.

6. The lightning protection repair system of claim 3, further comprising a moisture-resistant seal formed around the edge of the repair plate.

7. The lightning protection repair system of claim 6 wherein the moisture-resistant seal is made from a polysulfide sealant.

8. The lightning protection repair system of claim 6, further comprising a faired ramp of compound extending outwardly from the diversion plate along the surface of the aircraft graphite epoxy structure.

9. The lightning protection repair system of claim 8, further comprising a seal formed between the edge of the hole and the repair plate.

* * * * *